Jan. 22, 1946.  R. GOTTLIEB  2,393,463
MILLING TOOL
Filed April 8, 1943  3 Sheets-Sheet 1
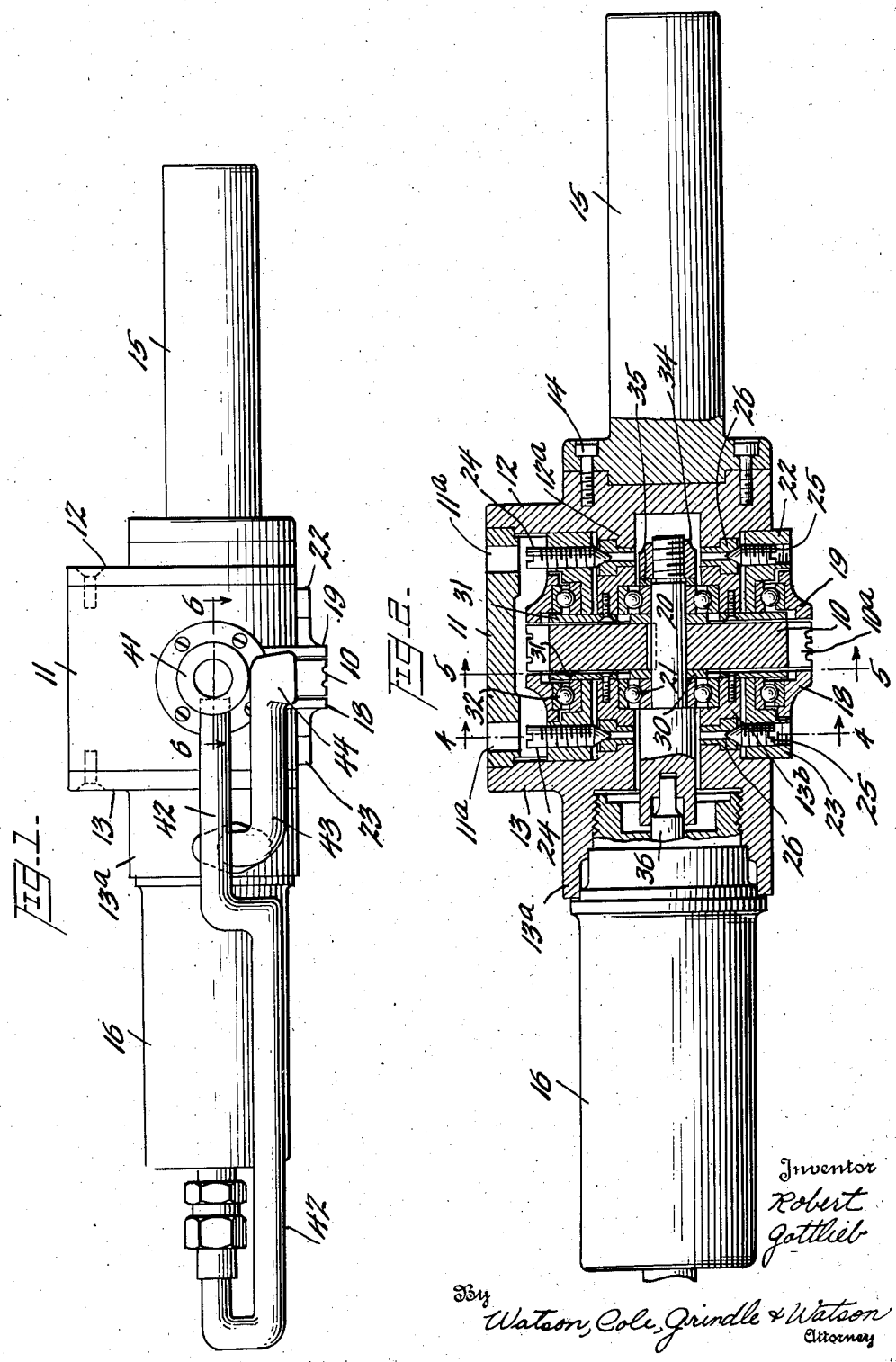
Inventor
Robert Gottlieb
By Watson, Cole, Grindle & Watson
Attorney Jan. 22, 1946.  R. GOTTLIEB  2,393,463
MILLING TOOL
Filed April 8, 1943  3 Sheets-Sheet 2
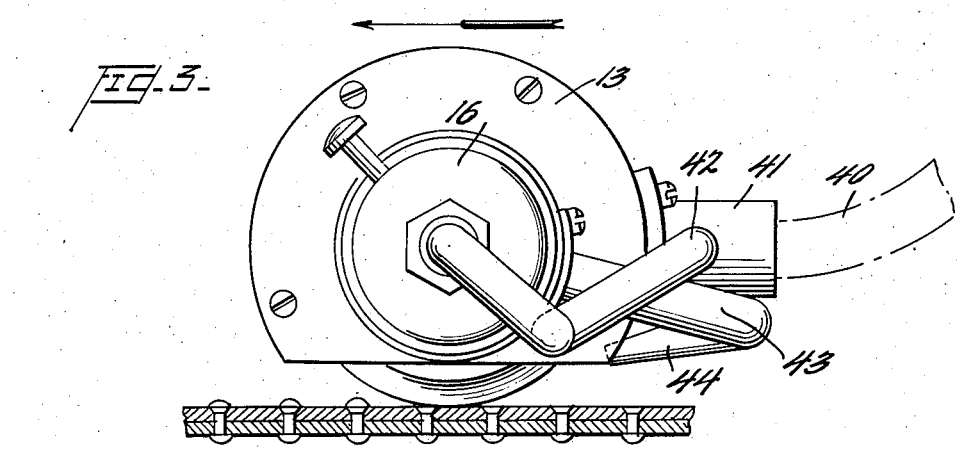
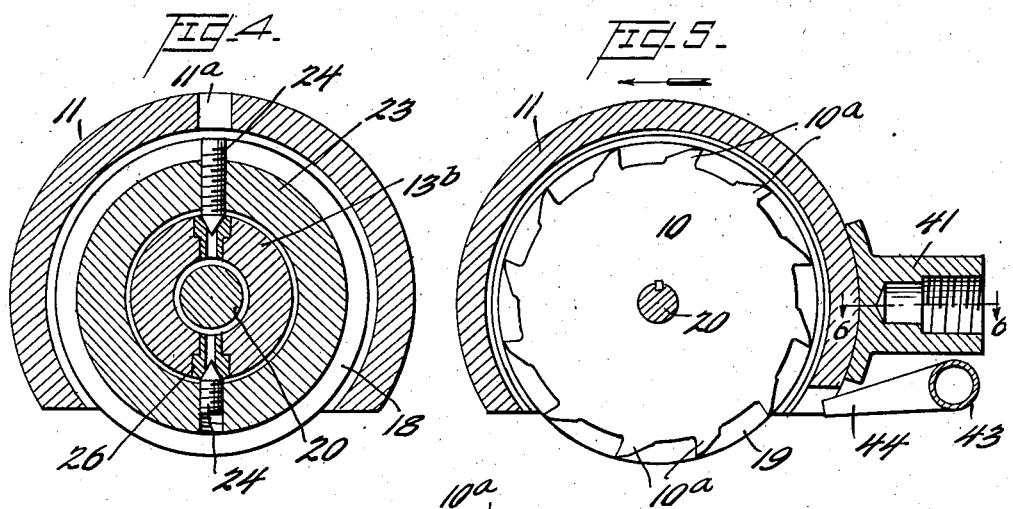
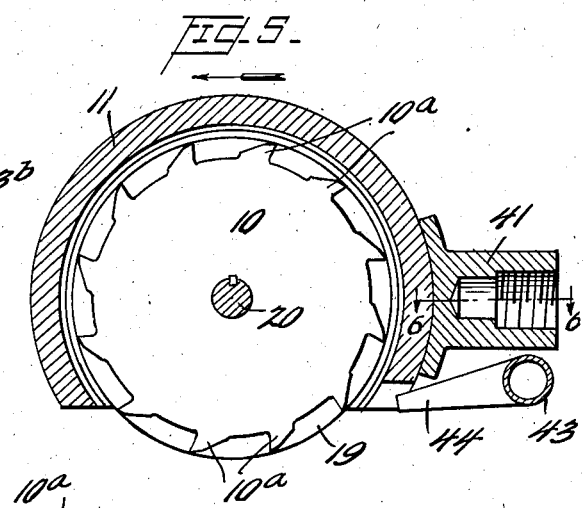
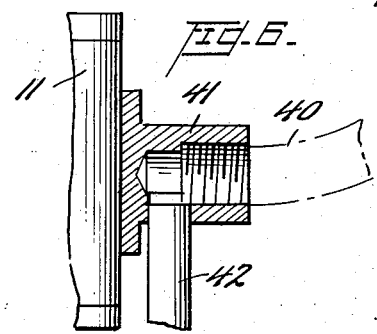
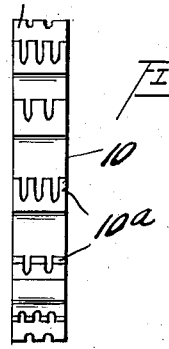
Inventor
Robert Gottlieb
By Watson, Cole, Grindle & Watson
Attorney

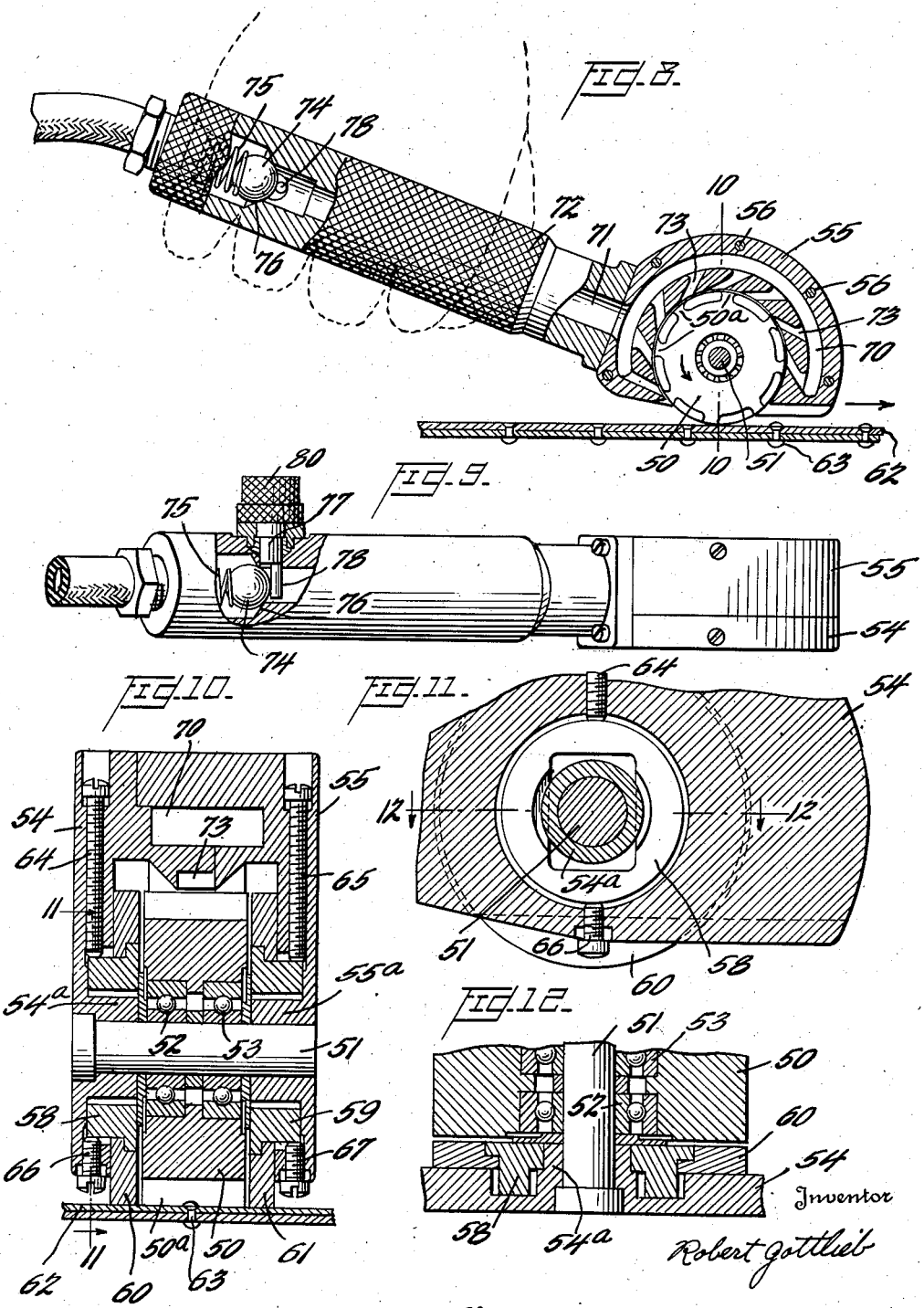

Patented Jan. 22, 1946

2,393,463

UNITED STATES PATENT OFFICE 2,393,463

MILLING TOOL

Robert Gottlieb, Newport News, Va., assignor of one-half to Albert Sherman, Bronx, N. Y.

Application April 8, 1943, Serial No. 482,304

6 Claims. (Cl. 90—12)

The present invention relates to milling cutters and particularly to milling cutters of light weight and small size and which are primarily intended for use as hand tools.

While many types of milling cutters have heretofore been designed or suggested but few have been intended for hand manipulation and, of those which have been designed in such manner that they may be readily maneuvered in the hands of an operator so as to be applied to a piece of work in various ways, no such cutter heretofore designed or used has been found to be capable of use in removing projections from articles having relatively smooth surfaces, for instance the heads of rivets which project above or beyond the surfaces of sheet metal member through which the rivets extend. In the manufacture of certain types of airplane wings and bodies for instance it is now found to be desirable to remove any small projecting rivet heads after the completion of all of the customary riveting operations.

It is a purpose of the present invention to provide a milling cutter which, while of general utility, is particularly suitable for use in the removal of those portions of rivet heads which project from smooth surfaced bodies. It will be appreciated that such a device, to be effective, must precisely remove the rivet head, but must not impair the smooth surface of the sheet or body through which the rivet passes. Any hand manipulated tool, such as a milling cutter, and which is power driven, must therefore be provided with means to govern and control the cutting action of the milling cutter most precisely. In accordance with the present invention a safeguarding and cut clearance-controlling means of novel character is provided, rendering the use of such tool eminently practical, it being quite possible with the aid of the improved milling cutter for an operator who lacks mechanical skill or long training to successively accomplish rapidly and economically the precise rivet head removing operation.

In the acompanying drawings two embodiments of the improved milling tool are disclosed by way of example. It will be appreciated by those skilled in the art that, in adapting the invention for the accomplishment of specific objectives, the design and arrangement of the component elements of the cutter may be considerably modified. Those forms, therefore, of the cutter which are disclosed are set forth by way of example.

In the drawings:

Figure 1 is a rear elevation of one form of the milling tool embodying the invention;

Figure 2 is a side elevation of the tool, its central portion being broken away, however, to show the interior details of construction;

Figure 3 is an end view of the tool, showing it in position to remove the heads from a row of rivets which have been passed through two members to be secured together;

Figure 4 is a section on line 4—4 of Figure 2;

Figure 5 is a section on line 5—5 of Figure 2;

Figure 6 is a section on line 6—6 of Figure 1;

Figure 7 is an edge view of the milling cutter;

Figure 8 is a view, partially in section and partially in elevation, of an alternative form of cutter;

Figure 9 is a top plan view of the cutter shown in Figure 8 also partially cut away to show interior parts;

Figure 10 is a section on line 10—10 of Figure 8 on a somewhat larger scale;

Figure 11 is a section on line 11—11 of Figure 10; and

Figure 12 is a section on line 12—12 of Figure 11.

In the form of the invention disclosed in Figures 1 to 7, inclusive, the milling cutter is indicated at 10, this cutter comprising a relatively short cylindrical body and a plurality of peripheral blades 10a. Encircling the periphery of the cutter is the cylindrical midportion 11 of a three-part housing, the housing end portions being indicated at 12 and 13, respectively. To the housing end portion 12 is secured, as by means of screw bolts 14, a cylindrical handle 15 and to the housing 13 there is secured a cylindrical motor housing 16, the reduced inner end of this housing having threaded engagement with the inner wall of a recess formed in the tubular portion 13a of housing member 13. Motor housing 16 is cylindrical and likewise functions as a handle, its axis being aligned with the axis of handle 15 and the milling cutter 10 being coaxial with the handles so that the operator, by grasping the members 15 and 16, can present the cutting blades of the milling cutter to any specified piece of work, and can also exert the desired pressure to force the cutting blades against the work. In order that the cutting blades shall not at any time be caused or allowed to engage the surface from which the rivet heads project rolling guides are provided, these guides being indicated at 18 and 19 in the drawings.

It will be observed that the outside cylindrical surfaces of the guides, which are of similar nature and annular in form, are substantially equal in diameter to the diameter of the circle which passes through the outer peripheries of the cutting edges of the teeth. The guides are so mounted, however, that they may be independently adjusted in planes normal to the axis of the milling cutter, i. e., radially of the milling cutter, so that the cylindrical outer surfaces thereof which contact with the work may be precisely positioned to give the milling cutter the exact depth of cut desired.

The milling cutter itself is fixed upon the cutter shaft 20, the cutter shaft being mounted in anti-friction bearings, preferably ball bearings 21 which bearings are in turn supported upon cylindrical hubs 12a and 13b which form portions of the casing and parts 12 and 13 respectively. The rolling guides 18 and 19 are carried, respectively, by annular carriers 22 and 23, respectively, these carriers encircling the hubs 12a and 13b and being substantially coaxial therewith, the cylindrical inner surfaces of the carriers, however, being spaced from the cylindrical outer surfaces of the hubs in order that the carriers may be adjusted relatively to the hubs in planes normal to the cutter axis.

The means for adjustably supporting the carrier 22 upon the hub 12a comprises aligned diametrically opposed screws, these screws being indicated at 24 and 25, respectively, each having threaded relation with a cylindrical inner wall of the radial recess in the associated carrier through which it passes and each having its pointed inner end in engagement with the hub 12a. It will be observed that inserts in the nature of bushings 26, supported in recesses formed in the hub 12a, are provided with conical seating surfaces to receive with a close fit the conical inner ends of the supporting screws 24 and 25, respectively. When these supporting screws are firmly seated as shown in Figure 2 the carrier 22 will be maintained in the position in which it is shown and, when the tool is in use the common axis of the adjusting screws 24 and 25 will be substantially vertical so that the screw 24 may be designated the upper screw and the screw 25 the lower screw. The outer end of each screw may be reached with a screwdriver, an aperture 11a being formed in the cylindrical casing 11 for the passage of a screwdriver to each screw 24, and the outer end of the lower screw 25 being at all times visible and accessible.

The means for adjustably supporting the carrier 23 upon the hub 13b, and hence adjusting rolling guide 18 radially of the cutting axis, is identical with that just described for adjustably supporting the rolling guide 19. The rolling guides 18 and 19 are, of course, individually adjustable and such adjustment may be effected from time to time as may prove to be necessary to give the desired depth of cut, the guides being adjusted upwardly from time to time as the cutting blades wear. The tool functions as a precision instrument, the cylindrical surfaces of the rolling guides 18 and 19 being closely adjacent the milling cutter 10 so that pressure upon the operating handles cannot disturb the relationship between the guiding surfaces and the cutting edges of the milling cutter. The screws 24 and 25 in reality comprise adjustable supports for the rolling guides and are so positioned, as previously pointed out, that when a tool is in cutting position, as shown in Figures 2, 3 and 4, adjustment of the screws effects vertical adjustment of the rolling guides. By reason of the use of ball bearings as anti-friction means between the rolling guides 19 and the annular carriers 22, the cutter shaft 20 and the hubs 12a and 13b, friction is reduced to the minimum and high speed operation made possible.

Suitable spacers indicated at 30, encircling the cutter shaft 20 and annular plates 31, secured to the ends of the respective hubs 12a and 13b, serve to retain the annular roller guide supporting bearings 32 in position. A suitable nut 34, which may be an elastic stop nut, has threaded relation with one end of the milling cutter shaft 20, and bears against an annular washer 35 which confines the inner race of the inner ball bearing 21. The enlarged opposite end of the milling cutter shaft 20 is operatively connected by means of an axially extending coupling member 36 with the rotor of an air motor enclosed within the housing 16. This air motor is not shown in detail and need not be described in detail inasmuch as any suitable motor, of which there are a number available on the market, may be employed to rotate the cutter shaft through the intermediate coupling member 36. It may be said, however, that a flexible conduit 40 from a suitable source of air under pressure may conveniently be connected to the coupling 41 attached centrally to the outer surface of the cylindrical casing member 11, air under pressure being led from coupling 41 through connecting duct 42 to the outer end of the motor housing 16. Conveniently also the exhaust air from the motor may be conducted through an exhaust duct 43 to a nozzle 44 which is directed toward the teeth of the milling cutter, the air blast issuing from nozzle 44 striking each successive tooth just after it has completed its working stroke, the air jet serving to blow away any chips which may tend to cling to the tooth and also having a cooling effect.

In the form of the invention shown in Figures 8 to 12, inclusive, the cutter 50 is mounted upon cutter shaft 51 by anti-friction means comprising roller bearings 52 and 53, so that the cutter may freely revolve on the cutter shaft instead of revolving with the cutter shaft as in the first form of the invention. The housing comprises two parts 54 and 55 secured together by bolts 56 and includes aligned hubs 54a and 55a in which the ends of the cutter shaft 51 are fixed. Encircling the hubs 54a and 55a are annular carriers 58 and 59, respectively, the inner cylindrical surfaces of these carriers being spaced from the cylindrical outer surfaces of the hubs 54a and 55a, as shown, to permit radial adjustment of the carriers with respect to the hubs and the cutter shaft. Rotatably supported upon the carriers 58 and 59 are the rolling guides 60 and 61, respectively, the cylindrical outer surfaces of these guides being adapted to engage the surface of a sheet metal member such as that indicated at 62 in Figures 8 and 10, to properly position the teeth of the cutter 50 so that the cutter can remove the projecting head of a rivet 63 without cutting into the surfaces of the plate 62.

The means for supporting the carriers 58 and 59 in the casing comprise adjusting screws as before, including upper adjusting screws 64 and 65 and lower adjusting screws 66 and 67. By loosening the lower screws 66 and 67 and tightening the upper screws 64 and 65, the rolling guides 60 and 61 may be lowered with respect to the cutter 50 and the cutting clearance increased. By reversing this process the cutting clearance may be decreased.

The blades 50a of the cutter 50 not only comprise cutting instrumentalities, but likewise comprise vanes against which jets of motive fluid under pressure are directed to cause rotation of the cutter. It will be observed in Figure 8 of the drawings that the housing includes an arc-shaped duct or passage 70 which is in constant communication with duct 71 which extends axially through the handle 72 which is attached to the casing or housing. In the inner wall of duct 70 are formed one or more short passages 73 which serve to direct jets of air or other motive fluid against the rear faces of the several cutting teeth 50a of the cutter, the rear surfaces of these teeth being cylindrically formed as shown in order to utilize to the maximum extent the kinetic energy of the several streams of motive fluid. By using air under substantial pressure the cutter 50 may be revolved at high speed. The duct passing through handle 72 is controlled by a ball valve 74 normally pressed by a spring 75 against a seat 76. A rotatable cylindrical plug 77, retained within a radial cylindrical aperture in the wall of the handle 72, carries at one end an eccentric pin 78 and at the other end, which is the outer end, a knurled button or finger-piece 80. By rotating the plug 77 the eccentric pin may be caused to lift the ball 74 from the seat 76 and to thus hold the valve open permitting flow of compressed air to the tool. When the plug 77 is turned to the position in which it is shown in Figure 9, however, ball 74 will seat and the flow of air thus be interrupted.

This form of milling cutter may be operated with great convenience in restricted spaces, only one hand of the operator being necessary to manipulate it and control it. It is of simple and rugged construction, inexpensive to construct and operate and of wide utility.

Having thus described the invention, what is claimed as new and desired to be secured by Letters Patent is:

1. A milling tool for use in removing those portions of rivets or the like which project outwardly beyond the smooth surfaces of riveted articles, comprising a housing having spaced coaxial hubs, a milling cutter shaft coaxial with said hubs and rotatably supported thereby, a milling cutter fixed on said shaft intermediate said hubs, an annular guide on each side of said milling cutter, an annular carrier associated with each annular guide and upon which such guide is rotatably supported, and means supporting said carriers, respectively, upon said hubs, for adjustment radially of the milling cutter shaft.

2. A milling tool for use in removing those portions of rivets or the like which project outwardly beyond the smooth surfaces of riveted articles, comprising a housing having spaced coaxial hubs, a milling cutter shaft coaxial with said hubs and rotatably supported thereby, a milling cutter fixed on said shaft intermediate said hubs, an annular guide on each side of said milling cutter, an annular carrier associated with each annular guide and upon which such guide is rotatably supported, and means supporting said carriers, respectively, upon said hubs, for adjustment individually radially of the milling cutter shaft.

3. A milling tool for use in removing those portions of rivets or the like which project outwardly beyond the smooth surfaces of riveted articles, comprising a housing having spaced coaxial hubs, a milling cutter shaft coaxial with said hubs and rotatably supported thereby, a milling cutter fixed on said shaft intermediate said hubs, an annular guide on each side of said milling cutter, an annular carrier associated with each annular guide and upon which such guide is rotatably supported, each such carrier encircling one of said hubs, and means for adjustably supporting each carrier upon the associated hub for adjustment radially thereof, said means including screws passing radially through the carrier and engaging the hub.

4. A milling tool for use in removing those portions of rivets or the like which project outwardly beyond the smooth surfaces of riveted articles, comprising a housing having spaced coaxial hubs, a milling cutter shaft coaxial with said hubs and rotatably supported thereby, a milling cutter fixed on said shaft intermediate said hubs, an annular guide on each side of said milling cutter, an annular carrier associated with each annular guide and upon which such guide is rotatably supported, each such carrier encircling one of said hubs, and means for adjustably supporting each carrier upon the associated hub for adjustment radially thereof, said means including aligned radially disposed adjusting screws the body portion of each has threaded engagement with said carrier and the inner end of which engages the hub.

5. The combination set forth in claim 4 in which the said hubs are provided with hardened steel inserts to receive the inner ends of the adjusting screws.

6. The combination set forth in claim 4 in which said screws are so positioned that, when the tool is positioned for cutting, the aligned axes of the pairs of adjusting screws are substantially vertically disposed.

ROBERT GOTTLIEB.